United States Patent
Gregory

[15] 3,683,088
[45] Aug. 8, 1972

[54] 2H-4,9-ETHANOBENZISOINDOLONES AND DERIVATIVES THEREOF AS PHARMACEUTICAL

[72] Inventor: Walter A. Gregory, Wilmington, Del.

[73] Assignee: E. I. du Pont de Nemours and Company, Wilmington, Del.

[22] Filed: Nov. 19, 1970

[21] Appl. No.: 91,219

Related U.S. Application Data

[63] Continuation-in-part of Ser. No. 763,029, Sept. 26, 1968, Pat. No. 3,584,009.

[52] U.S. Cl..................................................424/274
[51] Int. Cl. .............................................A61u 27/00

[58] Field of Search.....................................424/274

[56] References Cited

UNITED STATES PATENTS 3,126,396   3/1964   Kitahonoki et al..260/326.1 X

*Primary Examiner*—Stanley J. Friedman
*Attorney*—E. Leigh Hunt

[57] ABSTRACT

This invention relates to the use and pharmaceutical compositions of 2H-4,9-ethanobenzisoindolones, related compounds, and salts thereof for effecting analgesia.

10 Claims, No Drawings

2H-4.9-ETHANOBENZISOINDOLONES AND DERIVATIVES THEREOF AS PHARMACEUTICAL

RELATIONSHIP TO OTHER APPLICATIONS

This application is a continuation-in-part application directed to subject matter divided from my allowed copending application U.S. Ser. Number 763,029, filed Sept. 26, 1968 (now U.S. Pat. No. 3,584,009, dated June 8, 1971).

BACKGROUND OF THE INVENTION

This invention relates to the method of use and pharmaceutical compositions of, 2H- 4,9-ethanobenzisoindolones and derivatives thereof as pharmaceutical agents useful for relieving pain in warm-blooded animals, and preferably, useful as analgesics to relieve pain in mammals.

SUMMARY OF THE INVENTION

In summary, this invention relates to the method of use and pharmaceutical compositions of, 2H-4,9-ethanobenzisoindolones and derivatives thereof, useful for effecting analgesia, represented by the following formulae:

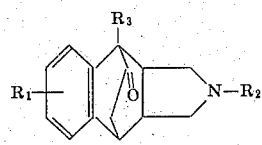

where
$R_1$ is hydrogen, $NO_2$, $OR_4$, or

where $R_4$ is hydrogen, alkyl of one through three carbons or

where $R_5$ is hydrogen or alkyl of one through three carbons, and $R_9$ is alkyl of one through six carbons;
$R_2$ is hydrogen alkyl of one through five carbons, alkenyl of three through five carbons, said alkenyl having the double bond in other than the 1-position, propargyl, cyclopropylmethyl or phenethyl;
$R_3$ is hydrogen, alkyl of one through three carbons, benzyl or phenethyl; and
the pharmaceutically acceptable salts of said compounds.

(2)

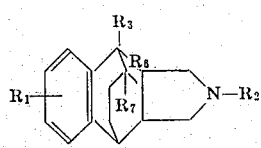

where
$R_1$ is hydrogen, $NO_2$ where R4 is hydrogen, alkyl of one through three carbons or

where $R_5$ is hydrogen or alkyl of one through three carbons; and $R_9$ is alkyl of one through six carbons;
$R_2$ is hydrogen, alkyl of one through five carbons, alkenyl of three through five carbons, said alkenyl having the double bond in other than the 1-position, propargyl, cyclopropylmethyl or phenethyl;
$R_3$ is hydrogen, alkyl of one through three carbons, benzyl or phenethyl;
$R_6$ is hydrogen or $OR_8$ where $R_8$ is hydrogen or alkyl of one through three carbons;
$R_7$ is hydrogen or alkoxy of one through three carbons with the limitation that when $R_6$ is hydroxy, $R_7$ is hydrogen; or
$R_7$ and $R_8$ taken together with the oxygens form cyclic alkyl ketal rings and together are alkylene of two or three carbons; and
the pharmaceutically acceptable salts of said compounds.

The pharmaceutical compositions comprise a compound of Formula (1) or (2) and a suitable pharmaceutical carrier.

The method of effecting analgesia in a warm-blooded animal comprises administering an analgetic effective amount of a compound of Formula (1) (2) to the animal.

DETAILED DESCRIPTION OF THE INVENTION

This invention is founded on the discovery that 2H-4,9ethanobenzisoindolones and the derivatives thereof, depicted at Formula (1) and (2) above, are useful as analgetic agents. The compounds useful in practicing this invention, when administered to an animal suffering pain, are effective in alleviating the discomfort, distress or agony associated with the pain.

Illustrative of the useful compounds are the following:

1,3,3a,4,9,9a-hexahydro-4,9ethano-2H-benz[f]isoindol-10-one
1,3,3a,4,9,9a-hexahydro-2-methyl-4,9-ethano-2H-benz[f]isoindol-10-one
1,3,3a, 4,9,9a-hexahydro-2-allyl-4,9-ethano-2H-benz[f]isoindol-10-one
1,3,3a,4,9,9a-hexahydro-2-(3,3-dimethylallyl)-4,9-ethano-2H-benz[f]isoindol-10-one
1,3,3a,4,9,9a-hexahydro-2-cyclopropylmethyl-4,9-ethano-2H-benz[f]isoindol-10-one
1,3,3a,4,9,9a-hexahydro-2-propargyl-4,9-ethano-2H-benz[f]isoindol-10-one
1,3,3a,4,9,9a-hexahydro-2-benzyl-4,9-ethano-2H-benz[f]isoindol-10-one
1,3,3a,4,9,9a-hexahydro-2-phenethyl-4,9ethano-2H-benz[f]isoindol-10-one
1,3,3a,4,9,9a-hexahydro-2,9-dimethyl-4,9-ethano-2H-benz[f]isoindol-10-one
1,3,3a,4,9,9a-hexahydro-9-benzyl-2-methyl-4,9-ethano-2H-benz[f]isoindol-10-one
6-acetyl-1,3,3a,4,9,9a-hexahydro-2-methyl-4,9-ethano-2H-benz[f]isoindol-10-one
6-acetyl-1,3,3a,4,9,9a-hexahydro-2-phenethyl-4,9-ethano-2H-benz[f]isoindol-10-one
1,3,3a,4,9,9a-hexahydro-5-hydroxy-2-methyl-4,9-ethano-2H-benz[f]isoindol-10-one
1,3,3a,4,9,9a-hexahydro-2-methyl-5-phenethyl-4,9-ethano-2H-benz[f]isoindol-10-one
1,3,3a,4,9,9a-hexahydro-2-methyl-5-methoxy-4,9-ethano-2H-benz[f]isoindol-10-one 1,3,3a,4,9,9a-hexahydro-6-hydroxy-2-methyl-4,9-ethano-2H-benz[f]isoindol-10-one 1,3,3a,4,9,9a-hexahydro-6-hydroxy-2-phenethyl-4,9-ethano-2H-benz[f]isoindol-10-one 1,3,3a,4,9,9a-hexahydro-6-methoxy-2-methyl-4,9-ethano-2H-benz[f]isoindol-10-one 1,3,3a,4,9,9a-hexahydro-2,9-dimethyl-6-hydroxy-4,9-ethano-2H-benz[f]isoindol-10-one 1,3,3a,4,9,9a-hexahydro-6-methoxy-9-methyl-2-phenethyl-4,9-ethano-2H-benz[f]isoindol-10-one The pharmaceutically acceptable salts of the above compounds are of course also useful and are included within the scope of this invention.

It will be understood that the term "pharmaceutically acceptable salts" as used herein is intended to include the salts of the useful compounds with a non-toxic anion. Representative of such salts are hydrochlorides, hydrobromides, sulfates, phosphates, nitrates, acetates, succinates, adipates, propionates, tartrates, maleates, citrates, bicarbonates, pamoates, cyclohexylsulfamates and acetylsalicylates. Of these, the hydrochlorides are preferred.

Of the useful compounds the following are preferred due to their high level of analgetic activity.

1,3,3a,4,9,9a-hexahydro-2-methyl-4,9-ethano-2H-benz[f]isoindol-10-one 1,3,3a,4,9,9a-hexahydro-2-(3,3-dimethylallyl)-4,9-ethano-2H-benz[f]isoindol-10-one 1,3,3a,4,9,9a-hexahydro-2-phenethyl-4,9-ethano-2H-benz[f]isoindol-10-one 1,3,3a,4,9,9a-hexahydro-2-methyl-6-hydroxy-4,9-ethano-2H-benz[f]isoindol-10-one 1,3,3a,4,9,9a-hexahydro-6-methoxy-2-methyl-4,9-ethano-2H-benz[f]isoindol-10-one Preparation Methods of preparing the compounds useful in the practice of this invention are described in my allowed parent application U.S. Ser. No. 763,029, filed Sept. 26, 1968, under the heading "Preparation" and in Examples 1–15.

It will be understood that the compounds useful in practicing this invention can exist in a number of isomeric forms.

For example, it is apparent from Formula (1) and (2) above that carboximide ring can be either endo or exo in relation to the ketone bridge. The exo isomers of the compounds are represented by the following formulae:

(3)

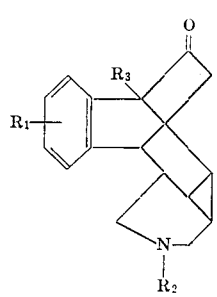

where $R_1$, $R_2$ and $R_3$ are defined as above; and (4)

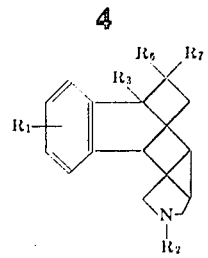

where $R_1$, $R_2$, $R_3$, $R_6$, and $R_7$ are defined as above.

The endo isomers of the compounds are represented by the following formulae:

(5)

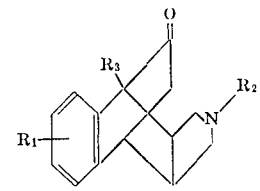

where $R_1$, $R_2$ and $R_3$ are defined as above; and (6)

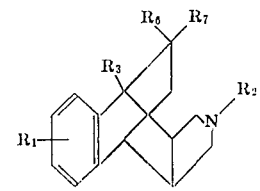

where $R_1$, $R_2$, $R_3$, $R_6$, and $R_7$ are defined as above.

In addition, the compounds exist in two forms which are non-superimposable mirror images of each other. It will therefore be understood that the d- and l-optical isomers of both the endo and exo compounds are included within the scope of compounds useful in the practice of this invention.

The following examples are referenced to further illustrate the preparation of the compounds useful in practicing this invention.

The examples of my parent application (Ser. No. 763,029) can be repeated substituting equivalent amounts of appropriate starting materials to obtain other useful compounds including those listed hereinbefore.

The compounds useful in practicing this invention can be administered to warm-blooded animals for analgesic effect according to this invention by any suitable means. For example, administration can be parenteral, that is subcutaneous, intramuscular, or intraperitoneal. Alternately or concurrently, administration can be by the oral route.

Of the above, the oral route of administration is preferred because of its convenience and aesthetic appeal to the pateient and also because the compounds of this invention have the advantage of being well absorbed after oral administration. It has been determined, using standard laboratory tests such as the Rat Tail Flick Test described later, that the compounds of this invention are almost as effective after oral administration as after parenteral administration.

The high level of oral effectiveness for the useful compounds is a distinct advantage over presently available analgetic agents of the same potency range. The presently available, highly-potent, analgetics are, in general, relatively poorly absorbed and require the administration of considerably larger quantities by the oral route as compared with the quantity administered by the parenteral route to obtain equivalent analgetic activity.

The dosage of useful compounds administered to the warm-blooded animal will depend on the age, health and weight of the said warm-blooded animal recipient, the frequency of administration and the intensity of pain to be alleviated. Generally, a daily dosage of active ingredient compound will be from about 0.03 mg. to 0.14 g. per kg. of body weight, although lower, such as 0.01 mg. per kg., or higher amounts can be used. Ordinarily, from 1.4 to 2.8 mg. per kg. of body weight per day, in single or divided doses and preferably in divided doses, is effective to obtain the desired analgetic response.

Formulations of the useful compounds for administration to subjects suffering from pain will contain besides the active ingredient of the useful compound, a solid or liquid non-toxic pharmaceutical carrier for the active ingredient.

One embodiment of a pharmaceutical composition of this invention is a gelatin capsule for oral administration containing from about 1–50 percent of a compound of this invention and 99–50 percent of a carrier. In another embodiment, the active ingredient is tableted with or without adjuvants. In yet another embodiment, the active ingredient is put into powder packets and employed. These capsules, tablets and powders will generally constitute from about 1 percent to about 95 percent and preferably from 1 percent to 50 percent by weight of active ingredient. These dosage forms contain from about 1 to 500 mg. of active ingredient, with from about 1 to about 100 mg. most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like.

In general, water, saline, aqueous dextrose and related sugar solutions and glycols such as propylene glycol or polyethylene glycols are the preferred liquid carriers for injectable solutions when the salts of the active ingredient are to be administered. When a parenteral dosage form of the free base, especially those useful compounds that do not readily form pharmaceutically acceptable salts, is desired, those oils hereinbefore enumerated are the most preferred pharmaceutical carriers.

The sterile parenteral dosage forms mentioned above will ordinarily contain from about 0.05 to 10 percent, and preferably about 0.1 to 1 percent by weight of the active ingredient.

In yet another embodiment of a pharmaceutical composition the active ingredient can be prepared for oral administration by incorporating it into a suitable liquid pharmaceutical carrier such as an aromatic water, elixir, syrup or a pharmaceutical mucilage.

Suitable pharmaceutical carriers are described in "Remington' Pharmaceutical Sciences" by E. W. Martin, a well-known reference text in this field.

In addition to the exemplary illustrations above, the following examples further explain other aspects of the present invention.

EXAMPLE 1

A large number of unit capsules are prepared for oral administration by filling each standard two-piece hard gelatin capsules with 25 milligrams of 1,3,3a,4,9,9a-hexahydro-2-methyl-4,9-ethano-2H-benz[f]isoindol-10-one hydrochloride, 8 milligrams of magnesium stearate, 40 milligrams of talc, and 327 milligrams of anhydrous lactose.

EXAMPLE 2

A large number of unit capsules are prepared for oral administration by filling each standard two-piece hard capsule with 10 milligrams 1,3,3a, 4,9,9a-hexahydro-2-phenethyl-4,9-ethano-2H-benz[f]isoindol-10-one hydrochloride, 3.5 milligrams magnesium stearate and 161.5 milligrams lactose.

EXAMPLE 3

A large number of soft gelatin capsules are prepared for oral administration by filling each capsule with 2.5 milligrams 1,3,3a,4,9,9a-hexahydro-2-(3,3-dimethyl-allyl)-4,9-ethano-2H-benz[f]isoindol-10-one, 125 milligrams of soybean oil, 4 milligrams of soy lecithin and 12 milligrams of a mixture of 1 part by weight of hydrogenated soybean oil, 1 part by weight of yellow beeswax and 4 parts by weight of partially hydrogenated mixed vegetable oils.

EXAMPLE 4

A large number of compressed tablets are prepared by conventional procedures so that the dosage unit is 25 milligrams of 1,3,3a,4,9,9a-hexahydro-2-methyl-6-hydroxy-4,9-ethano-2H-benz[f]isoindol-10-one, maleate, 160 milligrams of anhydrous lactose, 20 milligrams of microcrystalline cellulose, 4 milligrams of magnesium stearate and 0.2 milligrams of pyrogenic silica.

EXAMPLE 5

A large number of compressed tablets are prepared by conventional procedures so that the dosage unit is 50 milligrams 1,3,3a,4,9,9a-hexahydro-6-methoxy-2-methyl-4,9-ethano-2-H-benz[f]isoindol-10-one, 150 milligrams of lactose, 25 milligrams of cornstarch, 5 milligrams of magnesium stearate, 0.2 milligrams of pyrogenic silica and 12 milligrams of gelatin.

EXAMPLE 6

A parenteral composition for administration by injection is prepared by conventional procedures so that each milliliter of composition contains 25 mg. 1,3,3a,4,9,9a-hexahydro-2-methyl-4,9-ethano-2H-benz[f]isoindol-10-one, 0.125 ml. of 1N HCl, 9 mg. sodium chloride, sufficient 1 N sodium citrate to adjust the pH to a range of from 5.8–6.2 and q.s. with distilled water to 1 ml.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

I claim:
1. A method of effecting analgesia in warm-blooded animals which comprises administering to said warm-blooded animal an analgetic effective amount of a compound of the formula

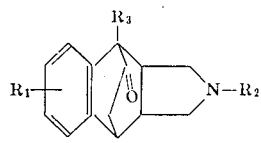

where
R₁ is hydrogen, NO₂, OR₄, or

where R₄ is hydrogen, alkyl of one through three carbons or

where R₅ is hydrogen or alkyl of one through three carbons and R₉ is alkyl of one through six carbons;
R₂ is hydrogen, alkyl of one through five carbons, alkenyl of three through five carbons, said alkenyl having the double bond in other than the 1-position, propargyl, cyclopropylmethyl or phenethyl;
R₃ is hydrogen, alkyl of one through three carbons, benzyl or phenethyl; or the pharmaceutically acceptable salt of said compound.

2. A method of effecting analgesia in warm-blooded animals which comprises administering to said warm-blooded animal an analgetic effective amount of a compound of the formula

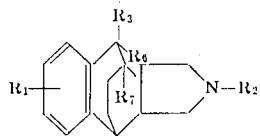

where
R₁ is hydrogen, NO₂, OR₄, or

where R₄ is hydrogen, alkyl of one through three carbons or

where R₅ is hydrogen or alkyl of one through three carbons and R₉ is alkyl of one through six carbons;
R₂ is hydrogen, alkyl of one through five carbons, alkenyl of three through five carbon, said alkenyl having the double bond in other than the 1-position, propargyl, cyclopropylmethyl or phenethyl;
R₃ is hydrogen, alkyl of one through three carbons, benzyl or phenethyl;
R₆ is hydrogen or OR₈ where R₈ is hydrogen or alkyl of one through three carbons;
R₇ is hydrogen or alkoxy of one through three carbons with the limitation that when R₆ is hydroxy, R₇ is hydrogen; or R₇ and R₈ taken together with the oxygens form cyclic alkyl ketal rings and together are alkylene of two or three carbons; or the pharmaceutically acceptable salt of said compound.

3. A method of effecting analgesia in warm-blooded animals which comprises administering to said warm-blooded animal an analgetic effective amount of compound of the formula

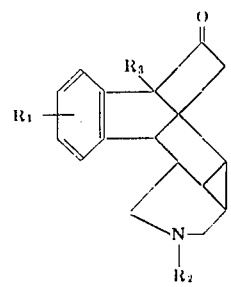

where
R₁ is hydrogen, NO₂ where R₄ is hydrogen, alkyl of one through three carbons or

where R₅ is hydrogen or alkyl of one through three carbons, and R₉ is alkyl of one through six carbons;
R₂ is hydrogen, alkyl of one through five carbons, alkenyl of three through five carbons, said alkenyl having the double bond in other than the 1-position, propargyl, cyclopropylmethyl or phenethyl;
R₃ is hydrogen, alkyl of one through three carbons, benzyl or phenethyl; or the pharmaceutically acceptable salt of said compound.

4. A method of effecting analgesia in warm-blooded animals which comprises administering to said warm-blooded animal an analgetic effective amount of a compound of the formula

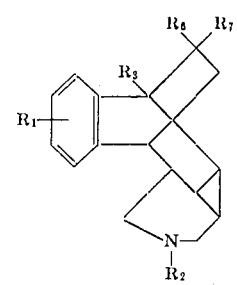

where
R₁ is hydrogen, NO₂, OR₄ or

where R₄ is hydrogen, alkyl of one through three carbons or

where R₅ is hydrogen or alkyl of one through three carbons; and R₉ is alkyl of one through six carbons;

$R_2$ is hydrogen, alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons, benzyl or phenethyl;

$R_6$ is hydrogen or $OR_8$ where $R_8$ is hydrogen or alkyl of one through three carbons;

$R_7$ is hydrogen or alkoxy of one through three carbons, with the limitation that when $R_6$ is hydroxy, $R_7$ is hydrogen; or $R_7$ and $R_8$ taken together with the oxygens form cyclic alkyl ketal rings and together are alkylene of two or three carbons; or the pharmaceutically acceptable salt of said compound.

5. A method of effecting analgesia in warm-blooded animals which comprises administering to said warm-blooded animal an analgetic effective amount of 1,3,3a,4,9,9a-hexahydro-2-methyl-4,9-ethano-2H-benz[f]isoindol-10-one.

6. A method of effecting analgesia in warm-blooded animals which comprises administering to said warm-blooded animal an analgetic effective amount of 1,3,3a,4,9,9a-hexahydro-2-(3,3-dimethylallyl)-4,9-ethano-2H-benz[f]isoindol-10-one.

7. A method of effecting analgesia in warm-blooded animals which comprises administering to said warm-blooded animal an analgetic effective amount of 1,3,3a,4,9,9a-hexahydro-2-phenethyl-4,9-ethano-2H-benz[f]isoindol-10-one.

8. A method of effecting analgesia is warm-blooded animals which comprises administering to said warm-blooded animal an analgesic effective amount of 1,3,3a,4,9,9a-hexahydro-2-methyl-6-hydroxy-4,9-ethano-2H-benz[f]isoindol-10-one.

9. A pharmaceutical composition comprised of from 5 to 99 percent of a suitable pharmaceutical carrier in combination with an active ingredient of a compound of the formula

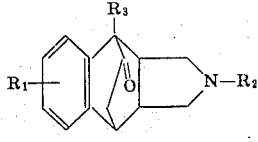

where
$R_1$ is hydrogen, $NO_2$, $OR_4$, or

where $R_4$ is hydrogen, alkyl of one through three carbons or

where $R_5$ is hydrogen or alkyl of one through three carbons and $R_9$ is alkyl of one through six carbons;

$R_2$ is hydrogen, alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons, benzyl or phenethyl; or the pharmaceutically acceptable salt of said compound.

10. A pharmaceutical composition comprised of from 5 to 99 percent of a suitable pharmaceutical carrier in combination with an active ingredient of a compound of the formula

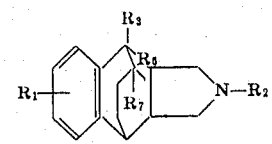

where
$R_1$ is hydrogen, $NO_2$, $OR_4$, or

where $R_4$ is hydrogen, alkyl of one through three carbons or

where $R_5$ is hydrogen or alkyl of one through three carbons and $R_9$ is alkyl of one through six carbons;

$R_2$ is hydrogen, alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons, benzyl or phenethyl;

$R_6$ is hydrogen or $OR_8$ where $R_8$ is hydrogen or alkyl of one through three carbons;

$R_7$ is hydrogen or alkoxy of one through three carbons with the limitation that when $R_6$ is hydroxy, $R_7$ is hydrogen; or $R_7$ and $R_8$ taken together with the oxygens form cyclic alkyl ketal rings and together are alkylene of two or three carbons; or the pharmaceutically acceptable salt of said compound.

* * * * *